United States Patent Office 3,397,188
Patented Aug. 13, 1968

3,397,188
POLY[PHENYLENE(DIFLUORO-
METHYLENE)SULFIDE]
Harry A. Smith, Midland, Mich., assignor to The Dow Chemical Company, Midland, Mich., a corporation of Delaware
No Drawing. Filed Jan. 26, 1967, Ser. No. 611,838
1 Claim. (Cl. 260—79)

ABSTRACT OF THE DISCLOSURE

The compositions are of the class of poly[phenylene-(difluoromethylene)sulfide] having recurring units of the structure

useful as a thermally stable laminating or molding resin. The process for making the composition employs a single aromatic compound, a sodium, potassium, lithium, or copper salt of an $\alpha,\alpha,\alpha$-trifluoro-m(or p)-toluenethiol, which homopolymerizes to yield the polymer.

This invention concerns a novel polymeric composition and method of preparation. More particularly, the invention concerns novel poly[phenylene(difluoromethylene)-sulfide] having recurring units of the structure

In addition, the invention concerns a process employing a single aromatic compound which homopolymerizes to yield the novel poly[phenylene(difluoromethylene)sulfide] readily separable from any co-product.

It is an object of the invention to provide poly[phenylene(difluoromethylene)sulfide]. Another object is to provide a process for the production of said polymer which can be carried out without any complicating reaction conditions.

According to the invention, poly[phenylene(difluoromethylene)sulfide] can be prepared by homopolymerizing a sodium, potassium, lithium, or copper salt of an $\alpha,\alpha,\alpha$-trifluoro-m(or p)-toluenethiol. The polymerization technique can be either bulk (mass) polymerization at a temperature below the melting point of the salt or solution polymerization, i.e. in the presence of a solvent substantially inert under the conditions of reaction. When polymerizing by the solution technique, the reaction temperature does not have to be below the melting point of the salt. A much wider range of reaction temperatures can be used, both below and above the melting point of the salt, in solution polymerization. In either method, the polymerization is preferably carried out under an inert atmosphere, and for a period of time sufficient to complete the polymerization to the desired degree. Thus, one can carry out the polymerization of the sodium, potassium, lithium, or copper salt for from 1 to 144 hours depending on the temperature of reaction, the use of solvents, etc. It is to be understood that when employing the solution polymerization technique greater freedom of reaction conditions can be obtained. Thus, for example, the temperature of reaction can be varied from well below the melting point of the salt to well above the melting point with attendant reduction and/or increase in reaction time and/or in pressure from atmospheric pressure to maintain the reaction mass (monomer and solvent) in the liquid state. Good results are obtained in either case, bulk or solution polymerization techniques, when the monomeric salt is of a purity above about 95 percent and preferably above 99 percent. While reactants of lesser purity will produce some of the desired product, chain length and yield of polymer are reduced.

The monomer employed in accordance with the present invention is a sodium, potassium, lithium, or copper salt of an $\alpha,\alpha,\alpha$-trifluoro-m(or p)-toluenethiol having the general formula:

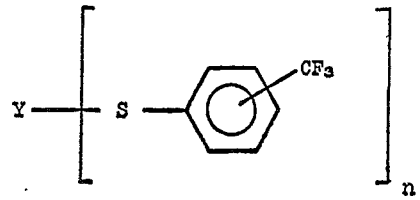

wherein the trifluoromethyl group can be meta or para to the sulfur atom, Y represents a sodium, potassium, lithium, or copper ion, and $n$ represents an integer equal to the valence of the sodium, potassium, lithium, or copper ion Y. The copper salt is the preferred monomer.

Suitable solvents for use in the solution polymerization technique include pyridine, quinoline, lutidine and the like. The preferred solvent is pyridine.

One manner of preparing the monomer employed in accordance with the present invention is by reacting sodium monosulfide, e.g. $Na_2S$, or $Na_2S \cdot 9H_2O$, and sulfur to produce sodium disulfide, then reacting the disulfide thus obtained with a m(or p)-halo-$\alpha,\alpha,\alpha$-trifluorotoluene such as m(or p)-bromo-$\alpha,\alpha,\alpha$-trifluorotoluene to obtain the disulfide of the $\alpha,\alpha,\alpha$-trifluoro-m(or p)-toluenethiol. This product together with copper powder is reacted in an alcohol solvent. The product of this reaction, i.e., the copper salt of the $\alpha,\alpha,\alpha$-trifluoro-m(or p)-toluenethiol, upon drying, is suitable for use as the starting material in the present invention.

Another manner of preparing the monomer employed in accordance with the present invention is by reacting by contacting in an inert solvent solution such as tetrahydrofuran the disulfide of $\alpha,\alpha,\alpha$-trifluoro-m(or p)-toluenethiol with a sodium-, potassium-, or lithium-naphthalene complex such as described in U.S. Patent 3,133,972 to produce the monomeric sodium, potassium, or lithium salts respectively.

Still another manner of preparing the monomer employed in accordance with the present invention is by reacting an $\alpha,\alpha,\alpha$-trifluoro-m(or p)-toluenethiol with cupuous oxide in an alcohol solvent. The product of this reaction, i.e., the copper salt of the $\alpha,\alpha,\alpha$-trifluoro-m(or p)-toluenethiol, upon drying is suitable for use as a starting material in the present invention. The sodium, potassium, or lithium salts can also be prepared from the thiol compound when it is available by substituting sodium hydroxide, potassium hydroxide, or lithium hydroxide respectively for the cuprous oxide described heretofore.

The following non-limiting examples serve to illustrate my invention.

Example I

*Monomer synthesis.*—10.56 grams (0.0440 mole) of sodium monosulfide ($Na_2S \cdot 9H_2O$) and 1.42 grams (0.0444 mole) of sulfur together with 20 ml. of water were mixed and were heated at a refluxing temperature for one hour. At the end of that time, the sodium sulfide had been completely converted to sodium disulfide.

To the solution of sodium disulfide was added 18.9 grams (0.084 mole) of p-bromo-$\alpha,\alpha,\alpha$-trifluorotoluene. 300 ml. of dimethylformamide was then added and the reaction mixture was brought to reflux and heated for 96 hours. A yellow precipitate formed which was filtered off and washed with water. The water washes were added to the dimethylformamide filtrate and the mixture was further diluted with another 600 ml. of water. After standing overnight, the organic layer was separated off, taken up in acetone, dried over calcium chloride, and then the solvent was removed. A brown, viscous oil was obtained. It was dissolved in a mixture of ethyl alcohol and water. This solution was treated with charcoal. The product was separated by crystallization. There was obtained 9.71 grams or 66 percent yield of the disulfide of $\alpha,\alpha,\alpha$-trifluoro-p-toluenethiol in the form of a white crystalline solid. This material melted at 119.5°–120° C. Infrared spectra was consistent with the desired compound.

In a similar manner 15.1 grams (0.084 mole) of p-chloro $\alpha,\alpha,\alpha$-trifluorotoluene and 13.8 grams (0.084 mole) of p-fluoro-$\alpha,\alpha,\alpha$-trifluorotoluene respectively were allowed to react with 0.044 mole of sodium disulfide resulting in a 12 percent and an 8 percent yield respectively of the disulfide of $\alpha,\alpha,\alpha$-trifluoro-p-toluenethiol.

A mixture of 0.21 gram (0.0006 mole) of the disulfide of $\alpha,\alpha,\alpha$-trifluoro-p-toluenethiol, 0.064 gram (0.0010 mole) of electrolytic copper dust and 0.10 ml. of pyridine is made up in 10 ml. of n-butyl alcohol in a manner similar to that described in U.S. Patent 3,291,779. This mixture is stirred and heated at reflux under a nitrogen atmosphere for 48 hours resulting in a 95 percent yield of the monomeric copper salt of $\alpha,\alpha,\alpha$-trifluoro-p-toluenethiol in the form of a yellow precipitate. The monomeric copper salt is polymerized in accordance with the procedure described in Examples IV and V below to produce the polymeric composition of the invention.

Example II

Procedure for preparing the monomeric salt from the disulfide of $\alpha,\alpha,\alpha$-trifluoro-m(or p)-toluenethiol.

(A) A mixture of 0.21 gram of the disulfide of $\alpha,\alpha,\alpha$-trifluoro-m-toluenethiol, 0.064 gram of copper powder (electrolytic dust), and 0.10 ml. of pyridine was made up in 10 ml. of n-butyl alcohol. The system was flushed with nitrogen prior to reaction. During the reaction, nitrogen was passed through the system. The reaction mixture was heated to reflux and stirred for 48 hours. The resulting bright yellow powder which precipitated was filtered off, washed with acetone, and dried. The yield of the monomeric copper salt of $\alpha,\alpha,\alpha$-trifluoro-m-toluenethiol was about 80 percent. The melting point of the salt was 282°–284° C. The monomeric salt is polymerized in accordance with the procedure described in Examples IV or V below to produce the polymeric composition of the invention.

(B) Following a procedure similar to that taught in U.S. Patent 3,133,972 a sodium-naphthalene complex is formed from 0.50 gram (0.0218 mole) of freshly cut sodium and 5.0 grams of naphthalene in 50 ml. of dry tetrahydrofuran. To this is added 3.85 grams (0.0109 mole) of the disulfide of $\alpha,\alpha,\alpha$-trifluoro-p-toluenethiol with stirring. A precipitate results which is filtered off, washed with dry ether, and dried under vacuum. The yield of the monomeric sodium salt of $\alpha,\alpha,\alpha$-trifluoro-p-toluenethiol is nearly quantitative.

The monomeric potassium and lithium salts of $\alpha,\alpha,\alpha$-trifluoro-p-toluenethiol are prepared by following a procedure similar to that used above except for substituting potassium and lithium respectively for sodium.

Except for substituting the disulfide of $\alpha,\alpha,\alpha$-trifluoro-m-toluenethiol for the para isomer, the monomeric sodium, potassium and lithium salts of $\alpha,\alpha,\alpha$-trifluoro-m-toluenethiol respectively are prepared following the same procedure as above. These monomeric sodium, potassium, and lithium salts are polymerized in accordance with the procedure described in Examples IV or V below to produce compositions according to the invention.

Example III (A) Procedure for preparing the monomeric copper salt when the thiol compound is available. 3.60 grams (0.0202) mole) of $\alpha,\alpha,\alpha$-trifluoro-m-toluenethiol was mixed with 1.43 grams (0.010 mole) of cuprous oxide in 25 ml. of ethanol. The atmosphere was replaced with nitrogen and the mixture was stirred under reflux for three hours. After cooling under nitrogen the monomeric copper salt in the form of a yellow powder was filtered off. When dried the yield was 3.7 grams or 76.1 percent of monomeric copper salt, again with a melting point of 282°–284° C. The monomeric salt is polymerized in accordance with the procedure described in Examples IV or V below to produce compositions according to the invention.

(B) The monomeric sodium, potassium and lithium salts are prepared from the thiol compound following the same procedure as in A, except for substituting 0.020 mole of sodium hydroxide, potassium hydroxide, and lithium hydroxide respectively for the cuprous oxide.

Example IV

Polymerization of the monomeric copper salt. One gram of the copper salt of $\alpha,\alpha,\alpha$-trifluoro-m-toluenethiol was placed in a glass ampoule under nitrogen. The tube was sealed and then the sample was heated for 5 days at 200° C. After cooling and opening the tube contained 1 gram of brown colored solid. The solid was treated with 50 ml. of concentrated hydrochloric acid for 1 hour to remove the inorganic by-products. The resulting mixture was filtered, washed with water, and then taken up in acetone. A 0.63 gram (92 percent) yield of poly[phenylene(difluoromethylene)sulfide] was obtained as a light tan solid. The degree of polymerization was about 12. The melting point of the polymeric material was 285°–310° C.

Example V

Solution polymerization of the monomeric copper salt. One gram of the monomeric copper salt of $\alpha,\alpha,\alpha$-trifluoro-m-toluenethiol was dissolved in 5 ml. of pyridine after being placed in a glass ampoule under nitrogen. The tube was sealed and the sample was heated for five days at 200° C. The resulting mixture was stirred with 100 ml. of concentrated hydrochloric acid, filtered, washed with water, and then taken up in acetone. A 0.27 gram (41 percent) yield of poly[phenylene(difluoromethylene)sulfide] was obtained as a tan solid. The melting point of the polymer obtained in this example was 285°–310° C.

In a manner similar to Examples IV and V, the monomeric copper salt of the para isomer, as well as the monomeric sodium, potassium or lithium salts of the meta or para isomers can also be polymerized to obtain a similar polymeric material.

The degree of polymerization of the novel polymer composition depends mainly on the extent of reaction and the purity of the monomer.

The new polymeric material is thermally stable in air to a temperature of at least 300° C. The polymer can be used as a thermally stable laminating resin, adhesive, or molding resin.

I claim:
1. A poly[phenylene(difluoromethylene)sulfide] consisting of recurring units of the structure
wherein the —CF$_2$S-radical is in the (m) or (p) position.
References Cited
UNITED STATES PATENTS
| | | | |
|---|---|---|---|
| 2,790,833 | 4/1957 | Liao | 260—79 |
| 3,133,972 | 5/1964 | Handlovits et al. | 260—608 |
| 2,274,165 | 9/1966 | Lenz et al. | 260—79 |
DONALD E. CZAJA, *Primary Examiner.*
M. I. MARQUIS, *Assistant Examiner.*